United States Patent

Heitbaum et al.

Patent Number: 5,213,914
Date of Patent: May 25, 1993

[54] NON-AQUEOUS, RECHARGEABLE ELECTROCHEMICAL CELL

[76] Inventors: Joachim Heitbaum, Friedrichsdörferstr. 35, 6380 Bad Homburg; Günther Hambitzer, Steigstrasse 14, 7507 Pfinztal 1, both of Fed. Rep. of Germany

[21] Appl. No.: 648,940

[22] Filed: Feb. 1, 1991

[51] Int. Cl.$^5$ .............................. H01M 10/40
[52] U.S. Cl. ..................... 429/197; 429/199; 429/218
[58] Field of Search ........... 429/194, 196, 218, 223, 429/245, 199, 197, 50; 252/182.1

[56] References Cited

U.S. PATENT DOCUMENTS

| | | | |
|---|---|---|---|
| 4,497,726 | 2/1985 | Brule et al. | 252/182.1 |
| 4,508,798 | 4/1985 | Gopikanth et al. | 429/196 |
| 4,770,960 | 9/1988 | Nagaura et al. | 429/218 X |
| 4,804,596 | 2/1989 | Ebner et al. | 429/218 X |
| 4,818,647 | 4/1989 | Plichta et al. | 429/218 |
| 4,891,281 | 1/1990 | Kuo et al. | 429/105 |

FOREIGN PATENT DOCUMENTS

| | | |
|---|---|---|
| 0017400 | 10/1980 | European Pat. Off. |
| 3122080A1 | 3/1982 | Fed. Rep. of Germany |
| 3604541A1 | 8/1987 | Fed. Rep. of Germany |
| 2548461 | 1/1985 | France |
| 2065957A | 7/1981 | United Kingdom |
| 2083942A | 3/1982 | United Kingdom |
| 2142469A | 1/1985 | United Kingdom |

Primary Examiner—Anthony Skapars
Attorney, Agent, or Firm—Nikaido, Marmelstein, Murray & Oram

[57] ABSTRACT

A non-aqueous rechargeable electrochemical cell is disclosed, wherein the cell includes a negative electrode a positive electrode and an electrolyte solution into which the electrodes are immersed. The negative electrode is made of lithium, and the positive electrode contains as the active material lithium cobalt oxide. The electrolyte solution is a solution of a lithium salt with an anion of a group 3A element halide in sulfur dioxide.

The cell of the present invention has a long cycle life and excellent electrical characteristics.

10 Claims, 2 Drawing Sheets

NON-AQUEOUS, RECHARGEABLE ELECTROCHEMICAL CELL

FIELD OF THE INVENTION

The present invention concerns a non-aqueous, rechargeable electrochemical lithium cell.

BACKGROUND OF INVENTION

The atomic mass of lithium is low and its standard electrode potential is negative. In the light of these properties lithium is latently well suited for making electrochemical cells (secondary battery elements) of high energy density. When used with a suitable positive electrode, high terminal potentials of more than three volts are possible. However, high terminal potentials entail the requirement that the electrolyte solution covering the positive and negative electrodes have a high decomposition voltage. If not, consumption of the active material of one of the electrodes and/or of the electrolyte solution occurs, and accordingly no useful battery element can be achieved. The active material, as used herein and in the art, is that component of an electrode which is converted during the electrode reaction and thereby determines the electrochemical properties of the cell.

In recent years a number of non-rechargeable electrochemical primary batteries that are lithium based have been developed, which exhibit high energy densities.

As regards the rechargeable electrochemical secondary batteries, they must meet further requirements in addition to high energy density. In particular such a cell should be rechargeable over a high number of cycles, while the capacity should remain as constant as possible, and also high currents should be possible both during the discharge and charge cycles.

It is known, for instance, from British patent documents A 2,083,942, and 2,142,469 and U.S. Pat. No. 4,891,281, to use an inorganic electrolyte solution wherein sulfur dioxide ($SO_2$) is the solvent. Chloride-containing electrolytes, in particular salts of lithium with a halide of a 3A element, are used therein. Illustratively such salts are $LiAlCl_4$ and $LiGaCl_4$. These known rechargeable cells however are not fully satisfactory as regards the possible number of charging/recharging cycles and long-term operability.

The object of an invention is to provide a rechargeable electrochemical cell which is characterized by a high energy density, a high number of possible charging and discharging cycles, high currents and good long-term operability.

SUMMARY OF THE INVENTION

The present invention is directed to a non-aqueous rechargeable electrochemical cell which includes a negative electrode, a positive electrode which contains an active material, and an electrolyte solution into which the electrodes are immersed. The negative electrode contains lithium, and the active substance of the positive electrode is a lithium cobalt oxide. The electrolyte solution is a solution of a lithium salt with an anion of a group 3A element halide as solute and sulfur dioxide ($SO_2$) as solvent. Preferably the lithium cobalt oxide active mass is supported on a metallic, conducting substrate, preferably of nickel or cobalt. The lithium salt solute is preferably lithiumtetrachloroaluminate ($LiAlCl_4$).

DESCRIPTION OF THE DRAWINGS

In the accompanying drawings.

DETAILED DESCRIPTION OF THE INVENTION

Figure 1:
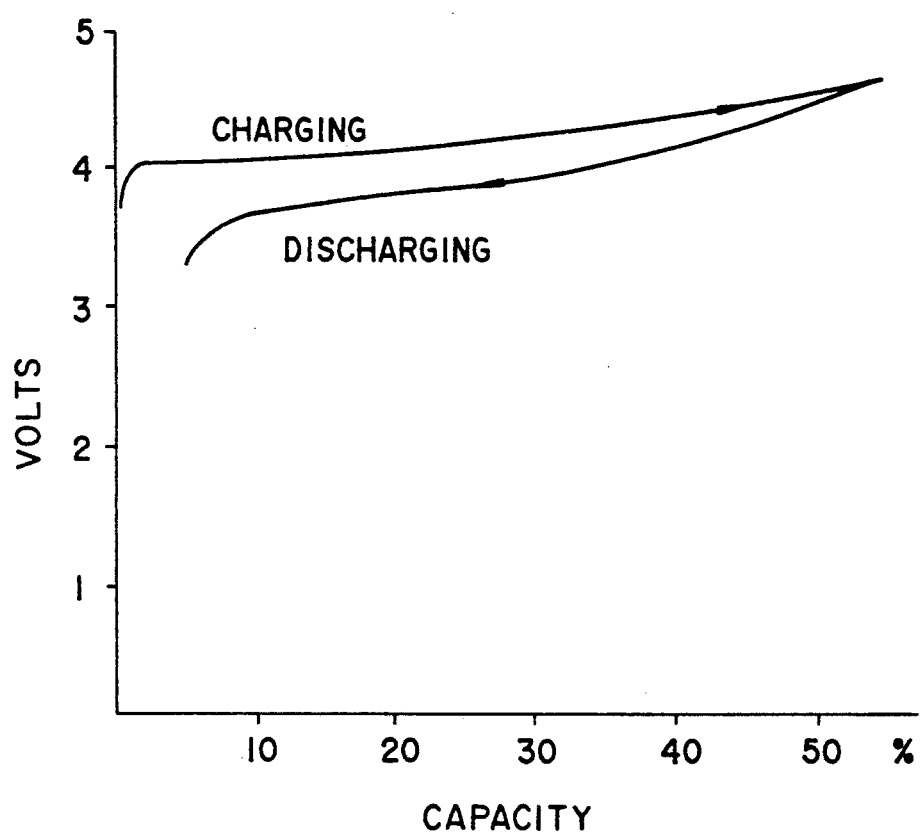
FIG. 1 illustrates the cell terminal voltage during the 23rd charge/discharge cycle as a function of capacity of the cell of the working example.

Lithium cobalt oxide was prepared early in the 1980's as an intercalation electrode and was investigated electrochemically in propylene carbonate (K. Mizushima et al, Mat. Res. Bull., vol. 15, pp 7830789, 1980). The material and its preparation are described in the European patent document A 0,017,400. The potential-determining reaction consists of the inclusion of a lithium ion into the host lattice with simultaneous reduction to trivalent cobalt or the transformation by oxidation into cobalt (IV) oxide. In these references, which are hereby incorporated by reference, the lithium cobalt oxide electrode is used solely in conjunction with organic electrolyte solutions.

As a rule the active substance $Li_xCo_yO_z$ lacks a rigorous stoichiometric relation between the constituents. Because of the charging-discharging process, "x" varies. It is less than or equal to 1. On account of possible inclusions (for instance of $Co_2O_3$ or $CoO$), the proportions of cobalt and oxygen in the lattice again frequently will not be strictly stoichiometric. Within the scope of the present invention, advantageously such inclusions are kept relatively low. In particular "y" is preferably between 0.9 and 1.1 and "z" between 1.9 and 2.1.

As a rule the active substance of the positive electrode is affixed to a metallic conducting substrate. In a preferred embodiment of the invention, the substrate which is used contains nickel or cobalt. Pure cobalt or nickel is especially preferred, or else an alloy with a very high proportion of cobalt or nickel (>90%).

A lithium salt especially well suited for the electrolyte solution was found to be lithium tetrachloroaluminate ($LiAlCl_4$). Preferably it is used in a large proportion relative to the sulfur dioxide. In an especially preferred embodiment, the amount of the salt is greater than the amount corresponding to a mol equivalence ratio of 1 to 3.5 relative to the sulfur dioxide, more preferably greater than an amount corresponding to a mol equivalence ratio of 1 to 2.

To increase the current density and stability of the intercalation electrode, one or more substances from the C, Ni, or Al groups, or binders such as polytetrafluoroethylene, polyethylene and similar plastics, can be added to the positive electrode.

Besides the $SO_2$, the electrolyte solution may also contain other solvents, for instance, one or more of $SOCl_2$, $SO_2Cl_2$, $S_2Cl_2$, and or $SCl_2$.

On the basis of the present invention, it is possible to achieve a rechargeable voltage element or cell potential exceeding 4 volts, and an energy density exceeding 200 watt-hours per kg. More than 200 charging and discharging cycles can be achieved, and power densities of more than 30 watt/kg can be obtained.

Primary and secondary batteries and electric cells are described in Kirk-Othmer, Encyclopedia of Chemical Technology, 3rd Edition, volume 3, pages 506–670, John Wiley and Sons, 1978, and especially secondary batteries and electric cells at pages 569–570, the disclosure of which is hereby incorporated by reference for the teaching of such cells and cell components therein.

The invention is elucidated below in relation to an illustrative embodiment.

80 mg of lithium cobalt oxide, 10 mg graphite and 10 mg of polytetrafluoroethylene were mixed in order to prepare the positive electrode. This mixture than was pressed by a hydraulic press into a tablet shape about 9 mm in diameter onto a nickel grid with simultaneous heating to 550°K for 24 h.

The electrode so made was sandwiched between two pure lithium electrodes of similar dimensions. The electrodes are kept apart from each other by separators, and were placed in a gas-tight and pressure-resistant glass cell.

The cell was filled with a 0.1M solution of $LiAlCl_4$ in $SO_2$ under pressure and was cyclically charged and discharged at a current of 20 ma between 3.3 and 4.5 v.

It was possible to cycle the cell 200 times. The capacity exceeded the theoretical capacity, calculated from the active mass of the positive electrode, by more than 50%.

FIG. 1 shows the cell terminal voltage during the 23rd charge-discharge cycle as a function of capacity (stated as a percentage of the theoretical capacity).

The proportion of the salt in the electrolyte solution was increased in the course of further experiments. The electrochemical properties were not degraded thereby. On the contrary, an increase of power density with salt concentration increase was observed. Another advantage of higher salt concentration is a lower vapor pressure whereby cells may be made without requiring pressure-resistant cases. The aforementioned boundary values were found especially advantageous.

Figure 2:
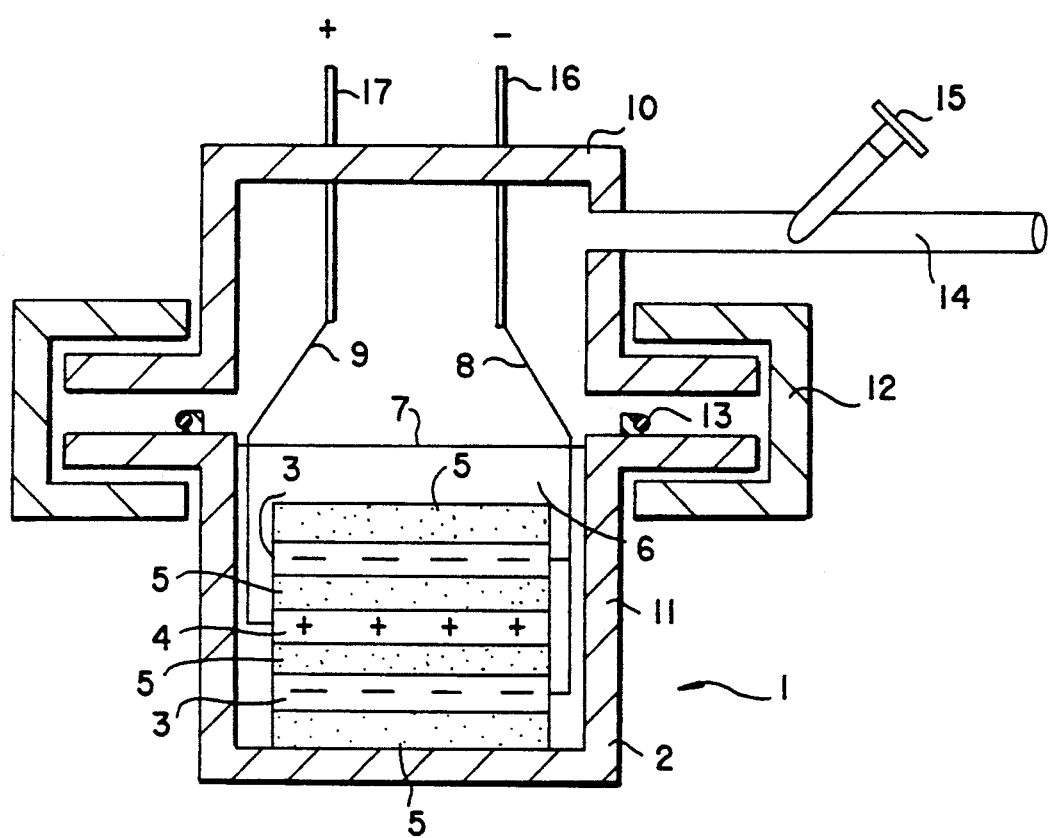
FIG. 2 represents a typical cell of the present invention.

The electrolytic cell of the example is illustrated in FIG. 2, wherein non-aqueous rechargeable electrolytic cell 1 includes a housing 2 made of glass to permit visual inspection. The electrodes are arranged in a sandwich construction wherein the negative electrodes 3 (thickness 0.5 mm) are located on each side of the positive electrode 4 (thickness 0.7 mm) and separated therefrom by separators 5 (thickness 0-15 mm). The upper and lower surfaces of the electrode assembly includes additional separators 5. This construction is conventional in the art to take into account the fact that the maximum current density of the negative electrode is lower than that of the positive electrodes. An electrolyte solution 6 fills the cell up to a level 7 where the electrodes are completely covered. Electrical connections are made by electrodes 8, 9, which in this instance were nickel wires. An upper portion 10 and a lower portion 11 of housing 2 are connected together by clamp 12, and seal 13 prevents leakage of the electrolyte solution. The seal 13 is conveniently a polytetrafluoroethylene seal. The electrolyte solution is filled into housing 2 through conduit 14, controlled by valve 15. Electrical connections can be made at electrodes 16, 17.

In the working example, the nickel grid supporting the active material of the positive electrode could be replaced by a cobalt grid with comparable results.

The present invention, while based upon a combination of features generally known in the art, is directed to a unique combination of such features, which produce a substantially superior result. Lithium is known as a material used for a negative electrode of an electrolytic cell, and has potential advantages due to the low density and negative voltage thereof. Lithium electrodes have been combined with an electrolyte solution which uses sulfur dioxide as a solvent and contains dissolved lithium salts, such as, for instance, $LiAlCl_4$ and $LiGaCl_4$. The prior art has tried using a substantial number of different positive electrodes in combination with the above features, but none of the resulting electrolytic cells have been satisfactory.

The present inventors have found that substantially superior results with respect to the electrolytic cell cycle life and long term durability of the rechargeable cell can be achieved by using lithium cobalt dioxide as the active material of the positive electrode.

The combination of lithium as a negative electrode and lithium cobalt dioxide as a positive electrode results in an extremely high open circuit voltage, the maximum of which is more than 4.5 volts. This causes substantial problems with respect to the "compatibility" requirements within the cell, as it would not be expected that lithium cobalt dioxide would be chemically stable in contact with an electrolyte solution containing chloride and sulfur dioxide. In particular, the art would expect that the $Cl_2$-gas which at such high potentials develops at the lithium cobalt oxide electrode would cause reaction of the metal oxide into the metal chloride. In the prior art electrolytic cells, the electrical potential is so much lower that stability problems caused by the production of $Cl_2$-gas were not generally found.

In view of the high electrical potential, the skilled workman in the art would expect the development of surface layers on the positive electrode, resulting in non-conducting properties, thereby causing unacceptable cell characteristics.

The stability of the electrolyte solution itself at such high voltages would not be predictable by the skilled artisan. It would be expected that irreversible reactions of the sulfur dioxide, for instance, with the electrode or with the $Cl_2$-gas, would cause undesirable consumption of materials.

In contrast to the above, the present invention has resulted in the development of an electrolytic cell of high electrical potential and excellent stability and cycle life.

We claim:

1. Non-aqueous rechargeable electrochemical cell comprising a negative electrode, a positive electrode containing an active material and an electrolyte solution into which said electrodes are immersed;

said negative electrode comprising lithium; said electrolyte solution comprising sulfur dioxide ($SO_2$) as solvent and at least one solute which is a lithium salt with an anion of a group 3A element halide; and said positive electrode comprising a lithium cobalt oxide as the active material.

2. The cell of claim 1 wherein said positive electrode includes a metallic conducting substrate said substrate containing cobalt.

3. The cell of claim 2 wherein the metallic conducting substrate consists essentially of cobalt.

4. The cell of claim 1 wherein said positive electrode includes a metallic conducting substrate said substrate containing nickel.

5. The cell of claim 4 wherein the metallic conducting substrate consists essentially of nickel.

6. The cell of claim 1 wherein said lithium salt is lithiumtetrachloroaluminate ($LiAlCl_4$).

7. The cell of claim 6 wherein said lithiumtetrachloroaluminate is present in the electrolyte in an amount greater than that corresponding to a mol equivalent ratio of 1:3.5 to the sulfur dioxide.

8. The cell of claim 7 wherein the lithiumtetrachloroaluminate is present in the electrolyte solution in an amount greater than that corresponding to a mol equivalent ratio of 1:2 to the sulfur dioxide.

9. A method of increasing the energy density and number of charging/discharging cycles of a non-aqueous rechargable electrochemical cell having a negative lithium electrode, a positive electrode and an electrolyte solution into which the electrodes are immersed, said method comprising using lithium cobalt oxide as the active material of the positive electrode, and using as the electrolyte solution a solution of at least one lithium salt with an anion of a group 3A halide in sulfur dioxide.

10. A non-aqueous rechargeable electrochemical cell having a cell potential greater than 4 volts, an energy density greater than 200 watt-hours per kg, a cycle life of greater than 200 charging and discharging cycles, and a power density of greater than 20 watt/kg, said cell including a negative electrode, a positive electrode and an electrolyte solution, wherein the positive electrode comprises a lithium cobalt oxide as the active material thereof, said negative electrode comprises lithium, and said electrolyte solution comprises sulfur dioxide ($SO_2$) as solvent and at least one solute which is a lithium salt with an anion of a group 3A element halide.

* * * * *